Dec. 8, 1931.  G. H. BOWLUS  1,835,630
AIRPLANE
Filed Jan. 13, 1930
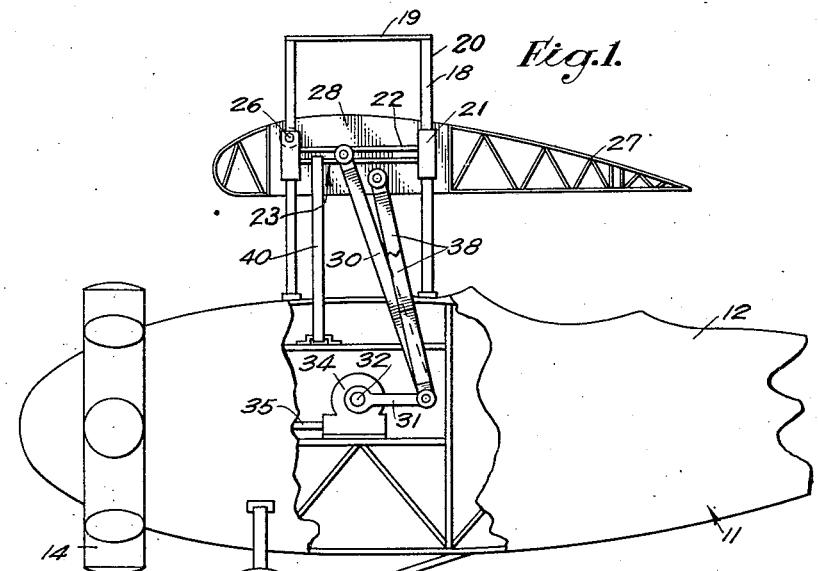
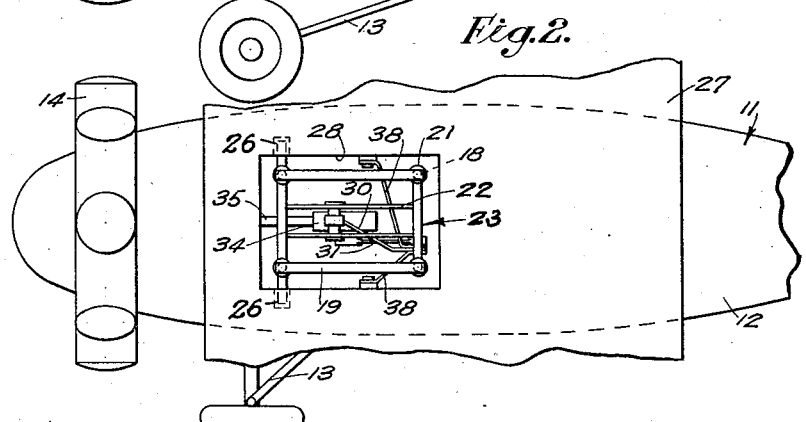
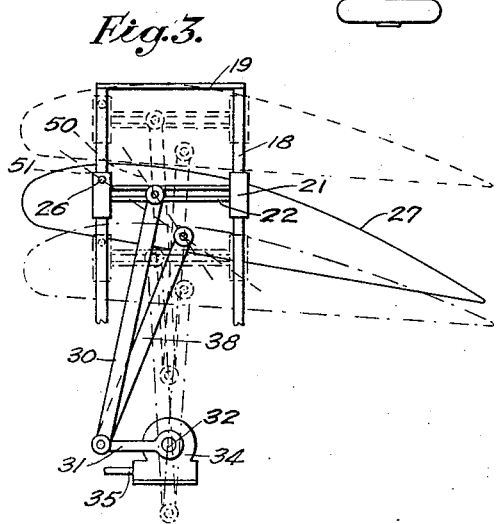
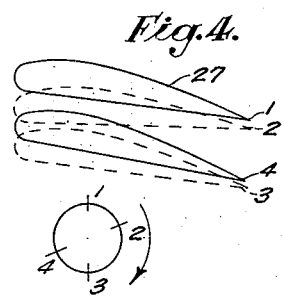
INVENTOR:
GLENN H. BOWLUS,
BY
ATTORNEY.

Patented Dec. 8, 1931

1,835,630

UNITED STATES PATENT OFFICE

GLENN H. BOWLUS, OF ALHAMBRA, CALIFORNIA

AIRPLANE

Application filed January 13, 1930. Serial No. 420,466.

My invention relates to airplanes in which the wings thereof are movable relative to the body structure and are used both to sustain and propel the airplane.

It is well known in the aeronautical art that when an aerofoil wing is moved through the air, a negative pressure is developed on the upper surface of the wing and a positive pressure is developed on the lower surface thereof. The difference in these pressures produces an upward force which is used to sustain the airplane in the air. It is further known that by moving the wing up and down relative to the body structure, and by inclining it upward during an upward movement thereof, and inclining it downward during a downward movement thereof, the sustaining force will have a forward, horizontal component which will propel the airplane through the air.

Several devices have been devised to accomplish this movement of the wing. Such devices have moved the wing relative to the body member with a rotary motion and this has made necessary the use of a cumbersome rotating element which is secured to the body structure for imparting the necessary motion to the wing.

It is an object of my invention to provide an airplane in which the wing thereof is moved up and down along a straight path relative to the body structure and is inclined relative to the body structure at the same time so that the wing will both sustain and propel the airplane.

Another object is to provide an airplane of the above class in which the wing is guided along a straight path by a guide means during the up and down movement thereof.

A further object is to provide an airplane of the above class in which the necessary motion of the wing is secured by a crank means carried by the body structure.

It is also an object to provide an airplane of the above class in which the crank means is connected to the wing in such a manner that only one crank is needed both to move and impart the proper inclination to the wing.

Further objects will be made evident in the following description of a preferred form of my invention.

In the drawings:

Fig. 1 is a partial sectioned view showing the operating means of my invention applied to an airplane.

Fig. 2 is a plan view of the airplane shown in Fig. 1.

Figs. 3 and 4 are diagrammatic views showing the operation of my invention.

Referring to Figs. 1 and 2, I show an airplane 11 with which the operating means of my invention finds particular utility. The airplane 11 may have a conventional body structure 12 below which is attached a landing gear 13, and to the forward end of which is secured a suitable motor 14. Secured to the upper side of the body structure 12 are upright guides 18 which are connected at the upper ends thereof by tie bars 19, thus forming a vertical frame structure 20. Slidable on the guides 18 are followers 21 which are tied together by horizontal members 22 and to form a reciprocable frame 23. The vertical frame structure 20 constitutes guide means for the reciprocable frame 23.

Pivoted to the frame 23 on pivots 26 is a wing 27 which has a central opening 28 through which the guides 18 extend. The wing 27 is thus made movable upward and downward relative to the body structure 12, and is guided in its upward and downward movement by the guides 18. The wing 27 is also pivoted to the frame 23 so that it may be inclined during its upward and downward movement in order that the sustaining force produced by a movement of the wing 27 through the air will have a forward, horizontal component for propelling the airplane 11.

In order to move the wing 27, an arm 30 is pivoted at its upper end to the frame 23 and is pivoted at its lower end to a crank 31 secured to a slow speed shaft 32 of a gear reducer 34. The gear reducer 34 is mounted on a part of the body structure 12 and has a high speed shaft 35 thereof driven by the motor 14. Pivoted also to the crank 31 are the lower ends of arms 38, the upper ends thereof being pivoted to the wing 27.

Secured between the frame 23 and the body structure 12 is a resilient member 40 which may be made of any suitable material such as rubber bands. The resilient member 40 counteracts the lifting force between the wing 27 and the body structure 12 so that a more constant load is placed on motor 14.

As clearly shown in Fig. 3, when the motor 14 rotates the high speed shaft 35 of the gear reducer 34, the crank 31 rotates and reciprocates the arms 30 and 38. The arm 30, being secured to the frame 23, moves the frame 23 up and down on the guides 18 with substantially harmonic motion. Due to the wing 27 being pivoted to the frame 23, the portion of the wing 27 adjacent the pivots 26 is moved with the same motion, and this portion of the wing 27 is therefore moved upward and downward relative to the frame structure 12.

The wing 27 is not inclined at the same angle relative to the frame structure 12 at all times during its upward and downward movement, but its inclination is varied by means of the arm 38. The action of the arm 38 in varying the inclination of the wing 27 can best be understood by considering that the arms 30 and 38 are in substantially the same fixed relationship relative to each other during their upward and downward movement. The arms 30 and 38 can therefore be considered as forming two sides of a triangle, the third side of which is formed by a line 50, as shown in Fig. 3, which line joins the upper ends of the arms 30 and 38. It will, therefore, be evident that as the arms 30 and 38 are inclined relative to the body structure 12, due to the rotation of the crank 31, the line 50 will be inclined proportionately. Since the motion of the upper end of the arm 30 is transmitted to the wing 27 by the pivots 26, a line 51 joining the pivots to the upper end of the arms 38 will also be inclined as the crank 31 rotates.

As clearly shown in Fig. 4, this produces an inclination of the wing 27 which varies synchronously with the upward and downward movement thereof, the transverse axis of the wing 27 being inclined downwardly during a downward movement of the wing, and being inclined upwardly during an upward movement thereof. This is the movement required for successful flight by reciprocating wing aircraft, as is well known in the aeronautical art, and the wing 27 is therefore capable of both sustaining and propelling the airplane 11.

It should be noted that the wing 27 is guided by the guides 18 in the upward and downward movement thereof, and that it moves over a substantially straight path. It should also be noted that the necessary upward and downward movement and the inclination of the wing are accomplished with only one crank.

The relationship of the points of attachment of the upper ends of the arms 30 and 38 is another important feature of my invention. It will be found that as the position of the point of attachment of the upper end of the arm 30 is moved closer to the pivots 26, the amount that the wing 27 inclines during its upward and downward movement, increases, and as this point is moved nearer the point of attachment of the upper end of the arms 38, the amount of inclination of the wing 27 is decreased. Thus it is possible to vary the amount of inclination of the wing 27 by varying the position of the point at which the arm 30 is secured to the frame 22. The amount of inclination of the wing 27 may also be varied by varying the position at which the arms 38 are secured to the wing 27, but it is more convenient to vary the point of attachment of the arm 30.

I claim as my invention:

1. In a flying machine, the combination of: a body structure; a wing movable upward and downward along a fixed path relative to said body structure and inclinable relative to said body structure; crank means carried by said body structure; and means connecting said crank means and said wing for moving said wing upward and downward and for inclining said wing during the upward and downward movement thereof.

2. In a flying machine, the combination of: a body structure; a movable wing; guide means carried by said body structure; a slidable member slidable on said guide means; means for pivoting said wing to said slidable member; crank means carried by said body structure; an arm connecting said crank means and said slidable member for moving said wing upward and downward; and an arm connecting said crank means and said wing for inclining said wing during the upward and downward movement thereof.

3. In a flying machine, the combination of: a body structure; a movable wing; guide means carried by said body structure; a slidable member slidable on said guide means; means for pivoting said wing to said slidable member about a primary point; crank means carried by said body structure; an arm pivoted to said crank means about a secondary point and operatively connected to said wing at said primary point; and an arm pivoted to said crank means about said secondary point and connected to said wing at a tertiary point, said tertiary point forming a triangle with said primary and secondary points.

4. In a flying machine, the combination of: a body; a vertical frame structure on said body; a follower slidable along said frame structure; a wing pivoted to said follower so as to move upward and downward therewith; and drive means for both moving said follower and oscillating said wing about the pivot point between said follower and said wing.

5. In a flying machine, the combination of: a body; a wing movable up and down relative to said body; a vertical frame structure secured to said body; a follower adapted for reciprocation on said frame structure, said wing being pivoted to said follower; and drive means for reciprocating said follower on said frame structure so that said wing is moved up and down and oscillated about a point between said follower and said wing.

6. In a flying machine, the combination of: a body; a vertical frame connected to and extending upwardly from said body; a follower member slidably mounted on said frame; a wing pivoted adjacent one end to said follower member; drive means for actuating said wing up and down on said frame; and link means connecting said follower member and said drive means for moving said wing up and down and oscillating it during said up and down movement.

In testimony whereof, I have hereunto set my hand at Los Angeles, California, this 8th day of January, 1930.

GLENN H. BOWLUS.